(12) United States Patent
Raisch

(10) Patent No.: US 11,391,353 B2
(45) Date of Patent: Jul. 19, 2022

(54) POWER SHIFT TRANSMISSION FOR AGRICULTURAL MACHINES

(71) Applicant: DEERE & COMPANY, Moline, IL (US)

(72) Inventor: Stefan Raisch, Vaihingen/Enz (DE)

(73) Assignee: DEERE & COMPANY, Moline, IL (US)

( * ) Notice: Subject to any disclaimer, the term of this patent is extended or adjusted under 35 U.S.C. 154(b) by 150 days.

(21) Appl. No.: 16/861,403

(22) Filed: Apr. 29, 2020

(65) Prior Publication Data

US 2020/0362950 A1 Nov. 19, 2020

(30) Foreign Application Priority Data

May 14, 2019 (DE) .......................... 102019206979.7

(51) Int. Cl.
| | |
|---|---|
| *F16H 37/04* | (2006.01) |
| *F16H 3/091* | (2006.01) |
| *F16H 3/093* | (2006.01) |
| *F16H 3/08* | (2006.01) |

(52) U.S. Cl.
CPC .......... *F16H 37/046* (2013.01); *F16H 3/091* (2013.01); *F16H 2003/0818* (2013.01)

(58) Field of Classification Search
CPC . F16H 37/046; F16H 3/091; F16H 2003/0818
See application file for complete search history.

(56) References Cited

U.S. PATENT DOCUMENTS

| | | | | |
|---|---|---|---|---|
| 4,074,581 A | * | 2/1978 | Stevens | ................... F16H 3/085 475/207 |
| 4,074,592 A | * | 2/1978 | Stevens | ................... F16H 3/085 475/219 |
| 5,709,628 A | | 1/1998 | Pidde et al. | |
| 8,596,157 B2 | | 12/2013 | Vu | |

(Continued)

FOREIGN PATENT DOCUMENTS

| | | |
|---|---|---|
| CN | 103459894 A | 12/2013 |
| DE | 10260179 A1 | 7/2004 |

(Continued)

OTHER PUBLICATIONS

European Search Report issued in counterpart application No. 20174037.0 dated Jul. 16, 2020 (08 pages).

*Primary Examiner* — Tisha D Lewis

(57) ABSTRACT

A power shift transmission for an agricultural machine includes a transmission housing, an input shaft unit and an output shaft. The input shaft unit and the output shaft extend at least partially inside the housing. The transmission includes an auxiliary shaft arranged offset but parallel between the input shaft unit and the output shaft inside the housing. The input shaft unit and the auxiliary shaft are connected together via an upstream group, and the auxiliary shaft and the output shaft are connected together via a downstream group. Each of the upstream and downstream shift groups includes gearwheel pairs which may be individually selectively coupled. The input shaft unit includes an outer shaft and an inner shaft which is arranged coaxially in the outer shaft and which is rotatable relative to the outer shaft. The inner shaft and the outer shaft are connected together via a layshaft.

14 Claims, 5 Drawing Sheets

(56) References Cited

U.S. PATENT DOCUMENTS

| | | | |
|---|---|---|---|
| 8,641,573 B2 * | 2/2014 | Ideshio | F02D 29/02 |
| | | | 475/218 |
| 9,879,761 B2 | 1/2018 | Vu | |
| 10,086,686 B2 | 10/2018 | Mueller et al. | |
| 10,240,668 B2 | 3/2019 | Raisch | |
| 10,352,401 B2 | 7/2019 | Raisch et al. | |
| 10,539,207 B2 | 1/2020 | Raisch et al. | |
| 2014/0296023 A1 | 10/2014 | Otten et al. | |
| 2015/0031491 A1 | 1/2015 | Otten et al. | |
| 2015/0300470 A1 | 10/2015 | Märkl et al. | |
| 2015/0375736 A1 | 12/2015 | Kaltenbach et al. | |
| 2016/0312872 A1 * | 10/2016 | Hirase | B62D 49/06 |
| 2018/0372188 A1 * | 12/2018 | Hana | F16H 3/091 |

FOREIGN PATENT DOCUMENTS

| | | | | |
|---|---|---|---|---|
| DE | 102011084037 A1 | | 3/2013 | |
| DE | 102014226469 A1 | | 6/2016 | |
| DE | 102015211809 A1 | | 12/2016 | |
| DE | 102015215726 A1 | | 2/2017 | |
| EP | 0745198 B1 | | 8/1998 | |
| EP | 1367296 B1 | | 12/2011 | |
| EP | 2916044 A1 | * | 9/2015 | F16H 37/042 |
| EP | 3109509 A1 | | 12/2016 | |
| EP | 3428480 A2 | | 1/2019 | |
| EP | 3446556 A1 | | 2/2019 | |
| JP | 2016210357 A | * | 12/2016 | B60W 10/10 |
| JP | 2017145899 A | * | 8/2017 | B60K 6/365 |
| KR | 1718147 B1 | * | 3/2017 | F16H 47/02 |
| WO | WO-2008151443 A1 | * | 12/2008 | F16D 21/08 |
| WO | WO2013064371 A1 | | 5/2013 | |
| WO | WO2013099840 A1 | | 7/2013 | |

* cited by examiner

POWER SHIFT TRANSMISSION FOR AGRICULTURAL MACHINES

RELATED APPLICATIONS

This application claims priority to German Patent Application Ser. No. 102019206979.7, filed May 14, 2019, the disclosure of which is hereby incorporated by reference in its entirety.

FIELD OF THE DISCLOSURE

The present disclosure relates to a power shift transmission for agricultural machines.

BACKGROUND

Power shift transmissions are a specific type of vehicle transmission in which a gear ratio may be altered under load, i.e., during travel, without interrupting the torque. As a result, even during the shifting process propulsive forces may be transmitted so that the vehicle may accelerate forward even during the shifting process. Thus, during the shifting process, there is no loss of driving comfort. Power shift transmissions are primarily used in agricultural utility vehicles, in particular in tractors, since they permit more rapid work, in particular when working in hilly terrain and on variable types of soil, and help to save fuel. In addition, some tractor transmissions are only able to be partially power shifted, which means that it is only possible to shift between some gears without interrupting the tractive force, while others (for example, a group change) are associated with an interruption to the tractive force.

It is known to configure such transmissions in combination with planetary transmissions and clutches in a modular system so that the power shift transmissions may be operated by a corresponding configuration and arrangement of gearwheel pairs of the planetary transmission in different operating modes, such as fixed drive mode, gear reduction mode and reversing mode. Thus, power shift transmissions are used on tractors as a preliminary transmission stage which, depending on the configuration of a stepped planetary set, may be operated either in the operating modes: fixed drive mode or reversing mode, or in the operating modes: fixed drive mode or gear reduction mode.

These transmissions are characterized in that in a first shifting a clutch connected to an input shaft connects the input shaft to the output shaft so that the transmission may be operated in fixed drive mode, wherein the planetary transmissions run as a free wheel. In a second shifting the clutch is released so that the planet carrier is driven by the input shaft and the planetary set rolls around a first sun gear fixed by a brake, the output shaft extending through the sun gear. The output is carried out via a second sun gear which is connected to the output shaft and which is driven by the planetary set. Depending on the assignment of the planetary set or configuration of the gearwheel sets of the planetary set and sun gears, the power shift transmission may be operated in gear reduction mode or in reversing mode.

Thus, a two-stage power shift transmission is provided which, however, is configured in a complex manner in terms of production technology and does not permit a further operating mode, for example, a crawling gear mode, in the aforementioned arrangement.

In EP 0 745 198 B1, a power shift transmission for mobile working machines is disclosed, as well as a method for controlling this power shift transmission. In this case, hydraulic motors which are connected together via a clutch are used. In a low speed range, the hydraulic motors are connected together in order to combine the torques. One of the hydraulic motors is reconfigured via a further clutch so that the hydraulic motors may be operated combined together at a rotational speed in an upper speed range.

A power shift transmission having an input shaft and an output shaft arranged coaxially thereto is disclosed in WO 2013/064371 A1. The power shift transmission has a planetary transmission set. The planetary transmission comprises a planet carrier which is connected to the input shaft. The first output shaft is able to be connected by a shift element to the sun of a stepped planetary set on the output side. The first output shaft is able to be connected directly to the input shaft by a second shift element. The sun gear of the stepped planetary set on the input side is connected fixedly in terms of rotation to a housing part of the power shift transmission.

Based on this prior art, there is a need for a power shift transmission which, on the one hand, is able to be implemented with a high number of gear variants, with at the same time a compact size, and which, on the other hand, is able to be used for a wide field of use.

SUMMARY

According to the disclosure, the power shift transmission comprises a transmission housing, an input shaft unit and an output shaft, wherein the input shaft unit and the output shaft extend at least partially inside the housing, wherein an auxiliary shaft is arranged offset in parallel between the input shaft unit and the output shaft inside the housing, wherein the input shaft unit and the auxiliary shaft are connected together via an upstream group, and the auxiliary shaft and the output shaft are connected together via a downstream group, wherein each shift group has gearwheel pairs which may be individually coupled or uncoupled and wherein the input shaft unit comprises an outer shaft and an inner shaft which is arranged coaxially on the outer shaft and which is rotatable relative to the outer shaft, and the inner shaft and the outer shaft are connected together via a layshaft.

Within the scope of this disclosure it is understood by the coupling or uncoupling of the individual gearwheel pairs that the gearwheel pairs are either in engagement with one another, and accordingly may transmit a torque from the one gearwheel to the other gearwheel of the gearwheel pair, or that these gearwheels of a gearwheel pair are not in engagement with one another. As a result, two gearwheels in engagement with one another are a coupled-together gearwheel pair.

The power shift transmission may be connected to a drive machine, for example, an internal combustion engine, via the inner shaft of the input shaft unit, so that the stored torque may be transmitted via the power shift transmission to the output shaft. Thus, a working machine or a drive shaft, for example, for wheels, may be attached to the output shaft.

As a whole, the power shift transmission has two shift groups and a layshaft. A layshaft is an extension of the gearbox which generally has at least two shifting states, wherein one shifting state is provided for a low load state and a further shifting state is provided for a high load state. For this reason the shifting states of the layshaft are generally denoted by "hi" for the high load state and by "lo" for the low load state. In the case of two shifting states, the gearshift variants available as a whole by the upstream group and the downstream group may be doubled by such a layshaft.

Generally, such a layshaft is always provided between two adjacent or superimposed shafts, whereby a correspondingly large constructional space of the transmission has to be made available in order to be able to arrange these two shafts which are connected together via the layshaft. However, the disclosure is based on the recognition that a more compact design may be achieved if the input shaft is configured in the form of an input shaft unit with two shafts arranged coaxially to one another in the form of an inner shaft and an outer shaft, wherein the layshaft then connects the inner shaft to the outer shaft. Accordingly, a torque is transmitted between the inner and outer shaft, whereby different peripheral speeds may be created between the inner and outer shaft.

According to a first embodiment of the disclosure, the layshaft has at least one planetary transmission stage with at least one sun gear, a ring gear, and a planetary group consisting of at least one first planet gear and at least one second planet gear. In this case, the first planet gear is arranged between the sun gear and the second planet gear, and the second planet gear is arranged between the first planet gear and the ring gear. Thus, the sun gear is connected to the ring gear via the first planet gear and the second planet gear. Generally, however, it is not the case that just one planet gear is respectively provided along the periphery in a planetary group. Instead, the ring gear is supported on the sun gear via at least three planet gears arranged along the periphery. In such a configuration, therefore, both three first planet gears and also three second planet gears might be present. Ultimately, however, the disclosure is not limited to such a configuration.

If the layshaft has such a planetary transmission stage the sun gear is coupled directly to the inner shaft of the input shaft unit.

The planetary group is coupled to the outer shaft of the input shaft unit. The particularity in a planetary transmission stage is that, based on a sun gear, a planetary group and a ring gear, two of these components may be respectively operated independently of one another. In the present case, both in the first and in the second shifted state, the ring gear is not fixed and accordingly is rotatably movable, based on the movement of the sun gear and the planetary group. The manner of the rotation in this case results from the rotation of the sun gear and the rotation of the planetary group.

In order to be able to implement two shifting states, in a first shifting state the planetary group is directly coupled to the inner shaft. Thus, both the sun gear and the planetary group have the same rotational speed, so that accordingly no relative movement is created between the planetary group and the sun gear. Since the outer shaft is also directly coupled to the planetary group, the rotational speed of the inner shaft is directly transmitted to the outer shaft. Thus, in a first shifting state of the layshaft, neither a step-up nor a step-down is implemented.

In a second shifting state, therefore, the planetary group of the planetary transmission stage is coupled to the inner shaft of the input shaft unit via at least one layshaft gearwheel pair. In this case, this layshaft gearwheel pair may either produce a step-up or a step-down so that accordingly the planetary group has a lower or a higher rotational speed relative to the sun gear. As a result, a relative speed is created between the sun gear and the planetary group, wherein the rotational direction of the sun gear and the planetary group is the same, however.

The individual shifting states are in each case implemented by a clutch, wherein multi-plate clutches are used. In order to carry out a step-down or step-up by the layshaft gearwheel pair in the second shifting state, at least one auxiliary shaft is provided, wherein the drive gearwheel of the at least one layshaft gearwheel pair is arranged on the inner shaft and the output gearwheel is arranged on the auxiliary shaft. However, a double step-down or step-up is carried out, wherein a second drive gearwheel is arranged on the auxiliary shaft and a corresponding second output gearwheel is arranged on an outer shaft portion of the layshaft, wherein the outer shaft portion is arranged coaxially to the inner shaft and correspondingly connected via a clutch to the planetary group.

The rotational direction of the output shaft may also be reversed in a simple manner via the planetary transmission stage. This is carried out via a reversal of the rotational direction of the outer shaft. To this end, the ring gear is fixed in terms of rotation, while the sun gear continues to be driven directly via the inner shaft. In contrast to the first and the second shifting state, now in a third shifting state only the ring gear is fixed, but the planetary group is uncoupled relative to the inner shaft. With a fixed ring gear and with a rotating sun gear, the planetary group carries out a rotation in an opposing direction relative to the sun gear. Thus, the rotation of the outer shaft is in an opposing direction relative to the first and the second shifting state.

Instead of a planetary transmission stage, the inner shaft may also be coupled to the outer shaft via a conventionally configured layshaft with two layshaft gearwheel pairs. This is a second embodiment of the disclosure. Accordingly, the layshaft has at least one first and one second layshaft gearwheel pair, wherein the inner shaft of the input unit in a first shifting state is connected directly or in a second shifting state is connected via the first and the second layshaft gearwheel pair to the outer shaft of the input unit. The essential difference relative to the first embodiment here is, however, that a reversal of the rotational direction of the outer shaft may not be carried out in a simple manner by fixing a ring gear of the planetary transmission stage. Instead, the rotational direction of the output shaft is now reversed such that in a third shifted state of the layshaft the inner shaft of the input shaft unit is coupled to the outer shaft of the input shaft unit via three gearwheels connected together in series. By the incorporation of a third gearwheel, a reversal of the rotational direction is now achieved relative to a single gearwheel pair.

Irrespective of the actual design of the layshaft, further shifting states are possible via an upstream group and a downstream group, wherein the drive gearwheels of the upstream group are arranged on the outer shaft of the input shaft unit and the output gearwheels of the upstream group are arranged on the auxiliary shaft. The drive gearwheels of the downstream group are arranged on the auxiliary shaft and the output gearwheels of the downstream group are arranged on the output shaft.

Moreover, the power shift transmission may also have a stage in which the upstream group is bridged. "Bridged" in this context does not mean, however, that in this shifting state the auxiliary shaft is not of interest. Instead, the auxiliary shaft serves as a carrier for an intermediate gearwheel. In this case, the drive gearwheel of the input shaft unit, as in the case of the other drive gearwheels of the upstream group, is arranged on the outer shaft and the output gearwheel is arranged on the output shaft. Therefore, the intermediate gearwheel is arranged on the auxiliary shaft between the drive gearwheel and the output gearwheel so that a torque is transmitted from the drive gearwheel via the intermediate gearwheel to the output gearwheel. Relative to a conventional distribution between the upstream group and downstream group, this results in the particularity that the torque is directly transmitted via the intermediate gearwheel. The additional coupling-in of a gearwheel of the downstream group is accordingly not required in order to carry out a rotation of the output shaft.

As already described above, a particularly compact design of the power shift transmission may be achieved by the embodiment of the input shaft unit with an inner shaft and an outer shaft. Such a configuration, however, is not limited to the input shaft unit. As an alternative, the auxiliary shaft and the output shaft may also be configured as an auxiliary shaft unit and output shaft unit and accordingly in each case have an inner shaft and an outer shaft mounted coaxially and rotatably thereto.

Such a configuration has the advantage that different rotational speeds between the inner shaft and the outer shaft may also be implemented for the auxiliary shaft unit and the output shaft unit, wherein different shifting states of the upstream group and downstream group may be implemented by differentiating whether the corresponding outer or inner shaft is driven by the corresponding output gearwheel.

Irrespective of the practical embodiment, the gearwheel pairs of the upstream group and the downstream group are coupled or uncoupled in each case via a separately assigned clutch, wherein the clutches are multi-plate clutches.

If the power shift transmission in its basic function is designed to transmit a torque from the input shaft unit to the output shaft, working machines such as, for example, pumps may be connected both to the input shaft and to the output shaft or even to auxiliary shafts so that a plurality of different machines may be operated at different rotational speeds and load states.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
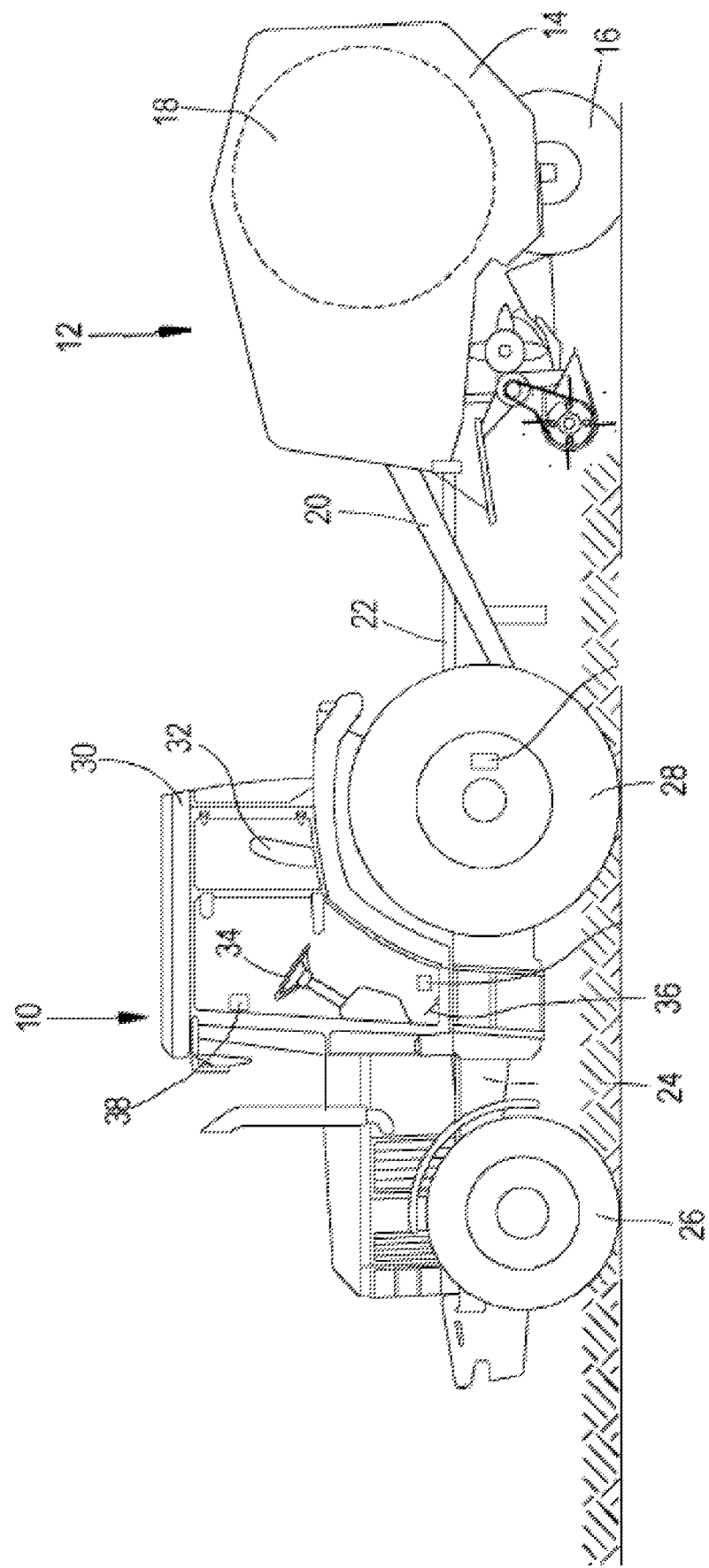
FIG. 1 shows a schematic view of an agricultural working machine.

FIG. 1 shows an agricultural working machine in the form of a tractor 10 and any desired device 12 which is pulled by the tractor and which in the illustrated embodiment is designed purely by way of example as a round baler. The device 12 comprises a chassis 14 supported on wheels 16, with a bale forming chamber 18. The device 12 is pulled by the tractor 10 via a tow bar 20. The drivable elements thereof are driven by a power take-off shaft 22 from the tractor 10.

The tractor 10 comprises a chassis 24 which is supported on front steerable wheels 26 and rear driven wheels 28. An operator workstation with a seat 32 is located in a cab 30. A steering wheel 34, a gas pedal 36 and a control panel 38 may be actuated from the seat.

Figure 2:
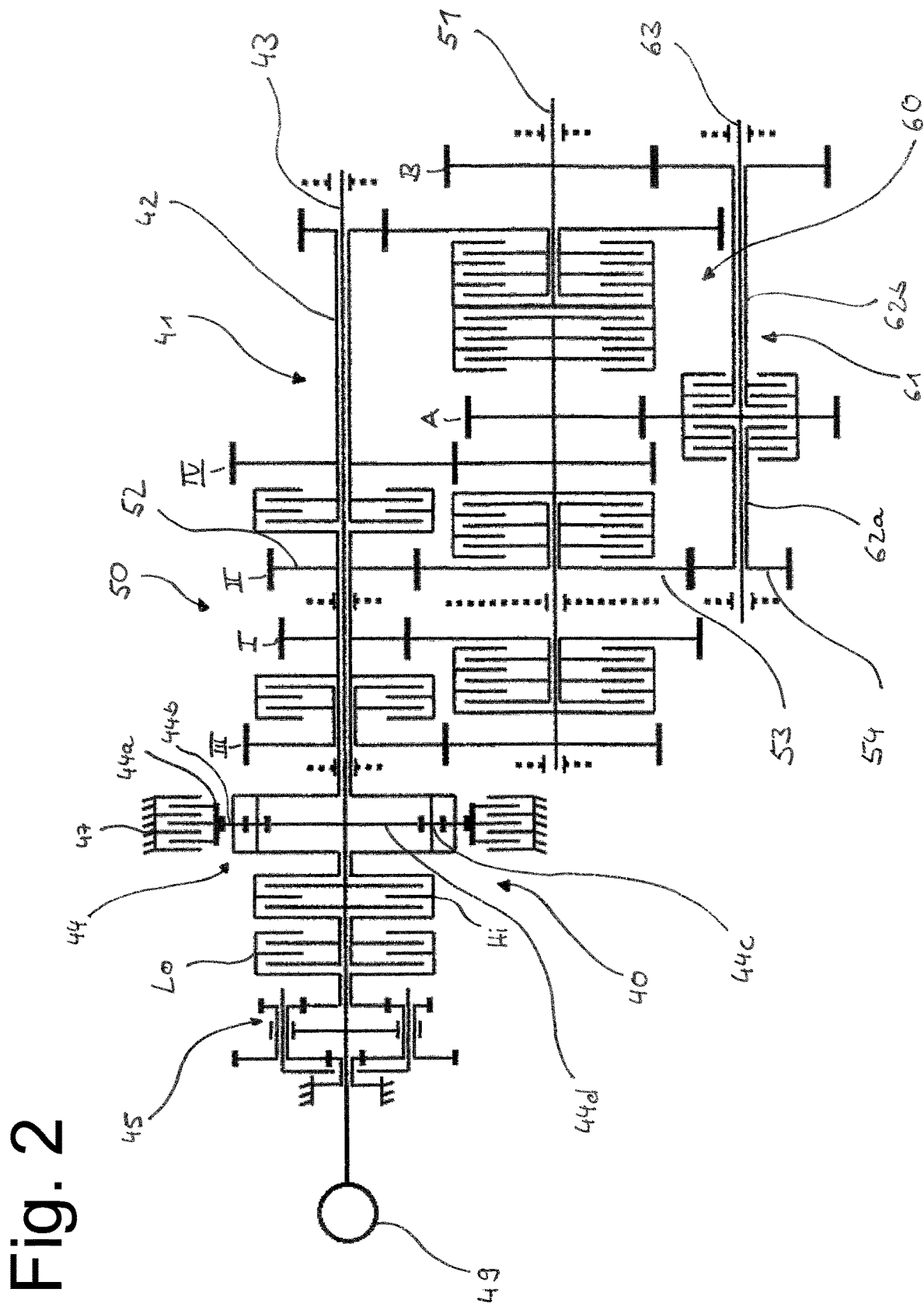
FIG. 2 shows a power shift transmission with a planetary transmission stage in the layshaft.

FIG. 2 shows a schematic diagram of the power shift transmission according to the present disclosure. The power shift transmission has an input shaft unit 41 consisting of an outer shaft 42 and an inner shaft 43, which is arranged coaxially in the outer shaft 42 and in an acceptable position relative to the outer shaft 42. Moreover, the power shift transmission has an output shaft 61 and an auxiliary shaft 51 offset in parallel relative to the input shaft unit 41 and the output shaft 61.

The inner shaft 43 of the input shaft unit 41 is directly coupled to a drive machine 49, wherein the transmission of torque from the drive machine 49 to the output shaft 61 is carried out via a layshaft 40, an upstream group 50 and a downstream group 60.

In this case, the layshaft 40 is provided between the inner shaft 43 and the outer shaft 42, wherein by the layshaft 40 different step-up or step-down ratios may be implemented between the inner shaft 43 and the outer shaft 42. This has the result that, in principle, different rotational speeds may be configured between the inner shaft 43 and the outer shaft 42.

In the embodiment according to FIG. 2, the layshaft 40 has a planetary transmission stage 44. This planetary transmission stage 44 is made up of a central sun gear 44d, a first planet gear 44c, a second planet gear 44b and a ring gear 44a. The sun gear 44d in this case is directly connected to the inner shaft 43. The outer shaft 42, however, is connected to the first and the second planet gear 44b, 44c which form a common so-called planetary group.

In principle, the layshaft 40 has two shifting states which may be shifted by actuating the clutches Lo and Hi. The clutch Lo in this case actuates a low load state and the clutch Hi actuates a high load state. The essential difference between these two shifting states results from the following observation. An actuation of the clutch Hi has the result that the planetary group is directly coupled to the inner shaft 43. Consequently, both the inner shaft 43, the sun gear 44d and the planetary group consisting of the planet gears 44b, 44c have the same rotational speed. Thus, no relative speed exists between the sun gear 44d and the planetary group.

As the planetary group is directly coupled to the outer shaft 42 of the input shaft unit 41, therefore, the rotational speed of the inner shaft 43 is transmitted unaltered to the outer shaft 42. Therefore in this context this is also called a direct shifting state.

In contrast thereto, when the clutch Lo is actuated the torque is transmitted from the inner shaft 43 via two gear-reduced layshaft gearwheel pairs 45 to the planetary group. In contrast to the shifting state Hi, therefore, the torque is transmitted in a gear-reduced manner to the planetary group, whereby the rotational speed of the planetary group and thus also of the outer shaft 42 differs from that of the sun gear 44d and the inner shaft 43. In spite of this gear reduction, however, both the inner shaft 43 and the outer shaft 42 have the same rotational direction, since this is maintained by the use of two layshaft gearwheel pairs 45.

However, a reversing unit which may be actuated via the clutch 47 is also implemented via the layshaft 40. The actuation of this clutch 47 leads to the ring gear 44a being fixed in terms of rotation. At the same time, the inner shaft 43 is also driven via the drive machine 49 in a first rotational direction. As in this state the clutches Lo and Hi are not actuated, the rotation of the planetary group is solely dependent on the rotation of the sun gear 44*d* and the ring gear 47. In order to be able to compensate for the rotation of the sun gear 44*d* relative to a fixed ring gear 44*a*, the planetary group performs a reverse rotation relative to the sun gear 44*d*. Since the planetary group is also connected to the outer shaft 42, however, the rotation of the outer shaft 42 is reversed.

The power shift transmission also has an upstream group 50 via which the torque is transmitted from the outer shaft 42 of the input shaft unit 41 to the auxiliary shaft 51. To this end, the upstream group 50 as a total of four gearwheel pairs I, II, III, IV which in each case are made up of a drive gearwheel on the output shaft 42 and an output gearwheel on the auxiliary shaft 51.

In turn, a downstream group 60 which has a total of two gearwheel pairs A, B is arranged between the auxiliary shaft 51 and the output shaft 61.

Here the particularity is that the output shaft 61 is also formed as an output shaft unit consisting of an output inner shaft 63 and an output outer shaft 62, wherein the output outer shaft 62 in turn is subdivided into two portions 62*a*, 62*b*. The output gearwheels of the downstream group 60 are arranged either on the output inner shaft 63 or the portion 62*b* of the output outer shaft 62.

Moreover, the downstream group 60 may also be bridged such that the torque is directly transmitted from a drive gearwheel of the upstream group 52 to an output gearwheel of the upstream group 54, wherein the output gearwheel 54 is arranged on the portion 62*a* of the output outer shaft 62. In order to ensure such a transmission, in this case the output gearwheel 53 of the upstream group 50 which is actually located on the auxiliary shaft 51 is configured as an intermediate gearwheel, via which the torque is transmitted from the drive gearwheel 52 to the output gearwheel 54.

Figure 3:
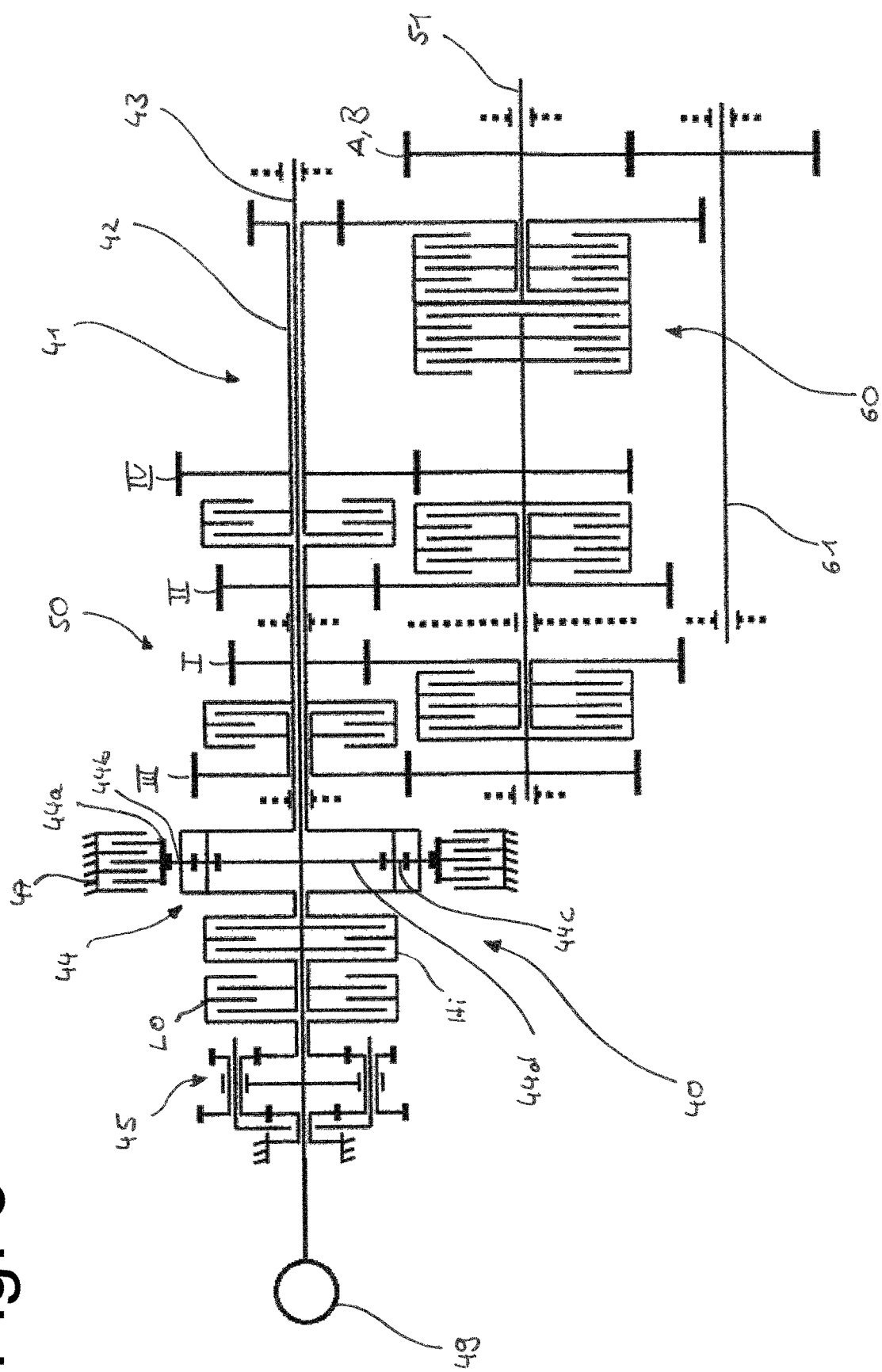
FIG. 3 shows an alternative embodiment of the power shift transmission according to FIG. 2.

FIG. 3 shows an alternative embodiment in which the downstream group 60 is implemented via only one gearwheel pair B, wherein the shifting states of the downstream group 60 are implemented via the variable coupling-in of the auxiliary shaft 51. Thus, the auxiliary shaft 51 has two auxiliary shaft portions 51*a*, 51*b* which are separate from one another and which may be coupled together and which are able to be coupled-in at different step-up or step-down ratios from the upstream group 41.

Figure 4:
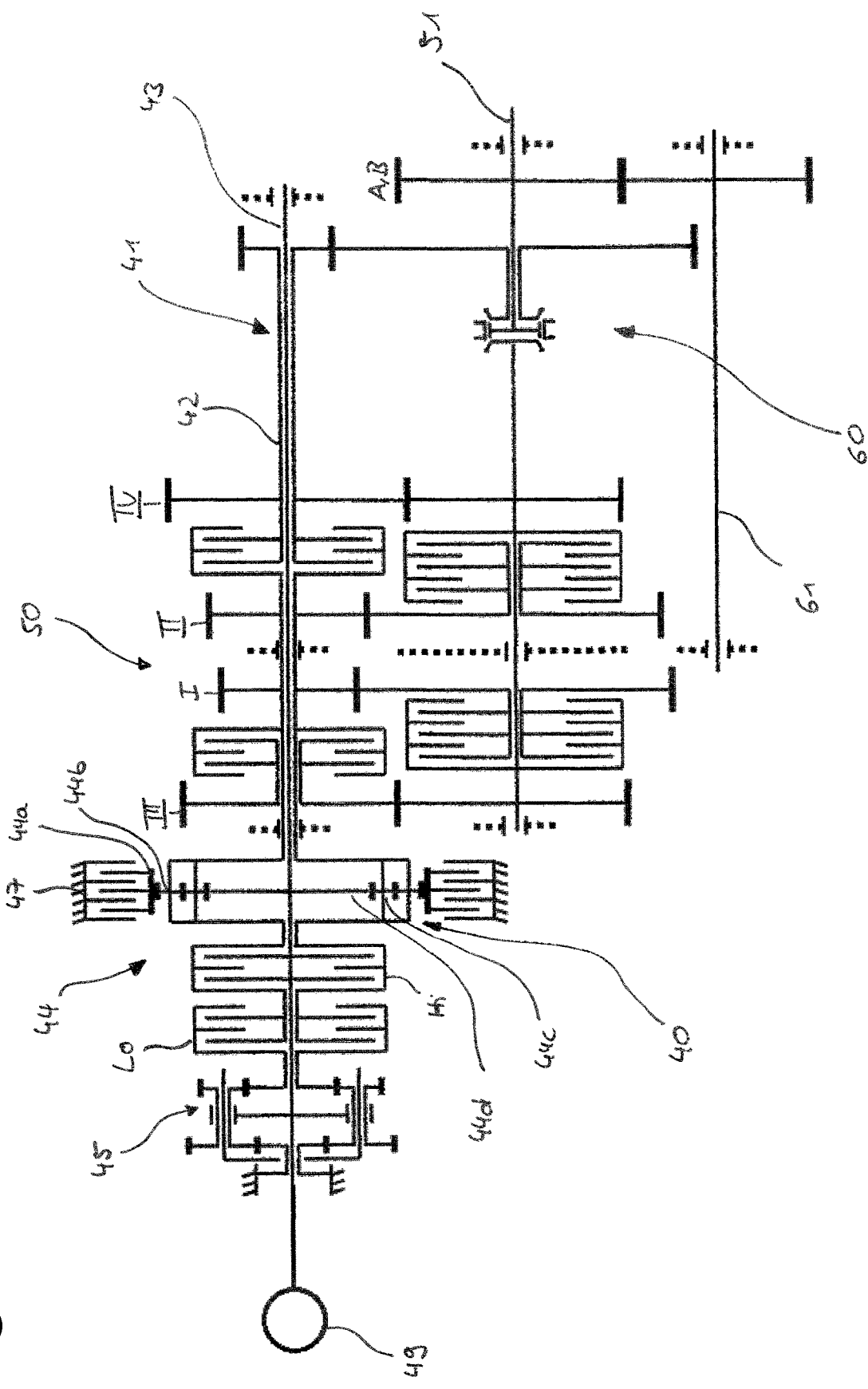
FIG. 4 shows a further alternative embodiment of the power shift transmission according to FIG. 2.

FIG. 4 substantially corresponds to the shifting principle of FIG. 3, wherein for the downstream group 60 the clutch is not implemented in the form of a multi-plate clutch, as was the case in the embodiments of FIG. 2 and FIG. 3, but in the form of a cone clutch.

Figure 5:
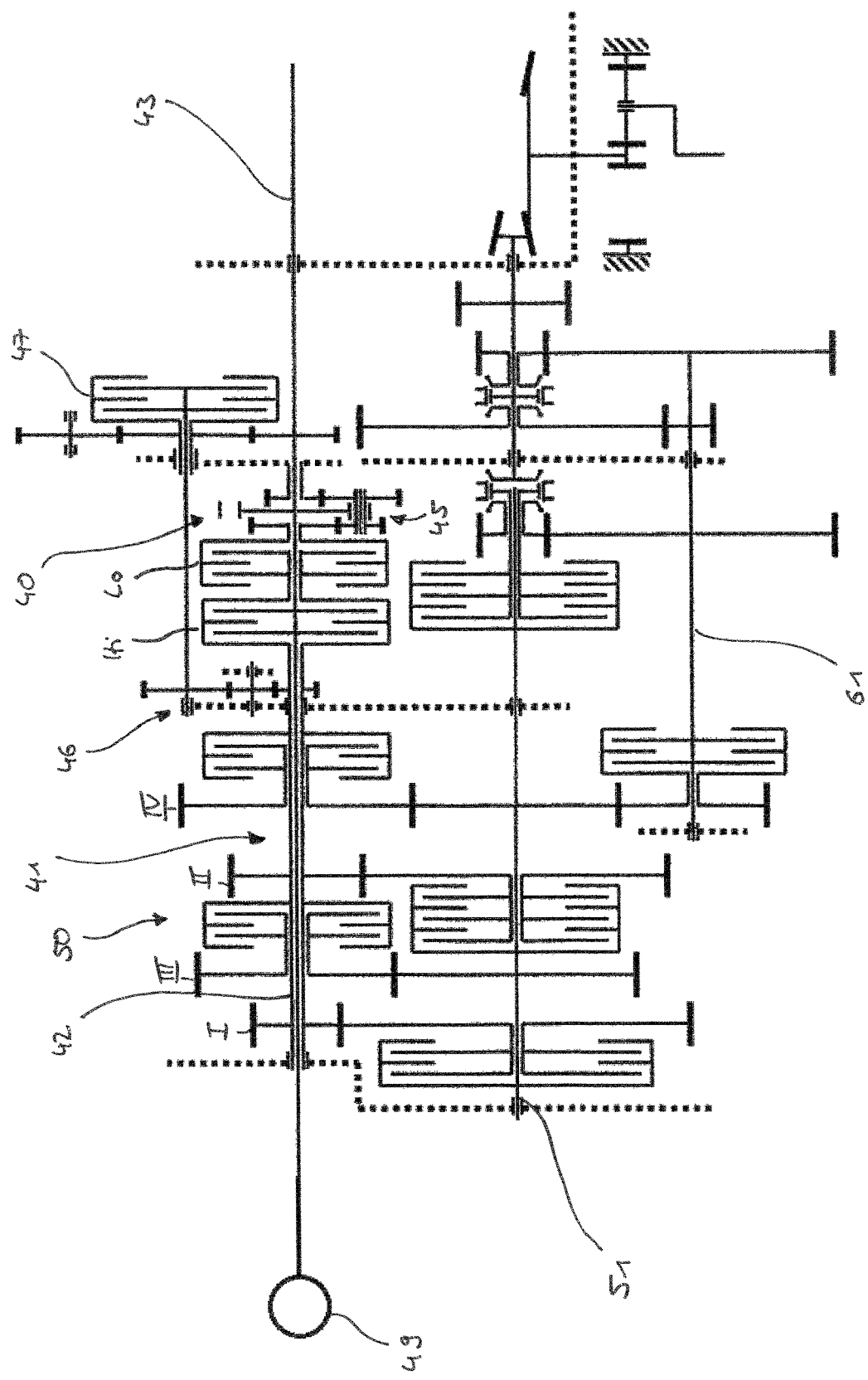
FIG. 5 shows an alternative power shift transmission with a layshaft produced via gear wheel pairs.

The embodiment of FIG. 5 substantially corresponds to the shifting principle of FIGS. 2 to 4, wherein the layshaft 40 does not now, however, have a planetary transmission stage 44. Instead, the inner shaft 43 is coupled to the outer shaft 42 either directly via the clutch Hi or directly via the layshaft gearwheel pairs 45, provided the clutch Lo is actuated. The reversal of the rotational direction of the outer shaft 42 is implemented via the clutch 47 and a total of three gearwheels 46 connected in series.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A power shift transmission for an agricultural machine, comprising:
    a transmission housing;
    an input shaft unit and an output shaft, the input shaft unit and the output shaft extending at least partially inside the housing; and
    an auxiliary shaft arranged offset in parallel between the input shaft unit and the output shaft inside the housing;
    wherein the input shaft unit and the auxiliary shaft are connected together via an upstream group, and the auxiliary shaft and the output shaft are connected together via a downstream group;
    wherein each of the upstream and downstream groups comprises gearwheel pairs which may be individually selectively coupled;
    wherein the input shaft unit comprises an outer shaft and an inner shaft which is arranged coaxially in the outer shaft and which is rotatable relative to the outer shaft, and the inner shaft and the outer shaft are connected together via a layshaft;
    wherein the layshaft has at least one planetary transmission stage with at least one sun gear, a ring gear, and a planetary group including at least one first and at least one second planet gear;
    wherein the at least one first planet gear is arranged between the sun gear and the at least one second planet gear, and the at least one second planet gear is arranged between the at least one first planet gear and the ring gear; and
    wherein the sun gear is coupled directly to the inner shaft of the input shaft unit.

2. The power shift transmission of claim 1, wherein the layshaft comprises at least one first and one second shifting state.

3. The power shift transmission of claim 1, wherein the planetary group is coupled to the outer shaft of the input shaft unit.

4. The power shift transmission of claim 1, wherein, in a first shifting state of the layshaft, the inner shaft of the input unit is directly coupled to the planetary group.

5. The power shift transmission of claim 4, wherein, in a second shifting state of the layshaft, the inner shaft of the input shaft unit is coupled via at least one layshaft gearwheel pair to the planetary group.

6. The power shift transmission of claim 5, wherein a rotational direction of the output shaft may be reversed such that in a third shifting state of the layshaft the ring gear is fixed from rotation.

7. The power shift transmission of claim 1, wherein the layshaft comprises at least one first and one second layshaft gearwheel pair, wherein the inner shaft of the input unit in a first shifting state is coupled directly to the outer shaft of the input unit.

8. The power shift transmission of claim 7, wherein the layshaft comprises at least one first and one second layshaft gearwheel pair, wherein the inner shaft of the input unit in a second shifting state is coupled via the first and the second layshaft gearwheel pair to the outer shaft of the input unit.

9. A power shift transmission for an agricultural machine, comprising:
    a transmission housing;

an input shaft unit and an output shaft, the input shaft unit and the output shaft extending at least partially inside the housing; and an auxiliary shaft arranged offset in parallel between the input shaft unit and the output shaft inside the housing;

wherein the input shaft unit and the auxiliary shaft are connected together via an upstream group, and the auxiliary shaft and the output shaft are connected together via a downstream group;

wherein each of the upstream and downstream groups comprises gearwheel pairs which may be individually selectively coupled;

wherein the input shaft unit comprises an outer shaft and an inner shaft which is arranged coaxially in the outer shaft and which is rotatable relative to the outer shaft, and the inner shaft and the outer shaft are connected together via a layshaft;

wherein the layshaft comprises at least one first and one second layshaft gearwheel pair, wherein the inner shaft of the input unit in a first shifting state is coupled directly to the outer shaft of the input unit;

wherein the inner shaft of the input unit in a second shifting state is coupled via the first and the second layshaft gearwheel pair; and wherein a rotational direction of the output shaft is reversible such that in a third shifting state of the layshaft the inner shaft of the input shaft unit is coupled to the outer shaft of the input shaft unit via three gearwheels connected together in series.

10. The power shift transmission of claim 1, wherein one or more drive gearwheels of the upstream group are arranged on the outer shaft of the input shaft unit the one or more output gearwheels of the upstream group are arranged on the auxiliary shaft.

11. The power shift transmission of claim 1, wherein one or more drive gearwheels of the downstream group are arranged on the auxiliary shaft and one or more output gearwheels of the downstream group are arranged on the output shaft.

12. The power shift transmission of claim 10, wherein one of the one or more output gearwheels of the upstream group is arranged on the output shaft and via an intermediate gearwheel on the auxiliary shaft is connected to one of the one or more drive gearwheels on the outer shaft of the input shaft unit.

13. The power shift transmission of claim 1, wherein the gearwheel pairs of the upstream and downstream groups are selectively coupled via a separately assigned clutch.

14. A power shift transmission for an agricultural machine, comprising:

a transmission housing;

an input shaft unit and an output shaft, wherein the input shaft unit and the output shaft extend at least partially inside the housing;

an auxiliary shaft arranged offset but parallel inside the housing between the input shaft unit and the output shaft; and an upstream group connecting the input shaft unit and the auxiliary shaft and a downstream group connecting the auxiliary shaft and the output shaft, wherein each of the upstream and downstream groups comprises gearwheel pairs which may be individually selectively coupled;

wherein the input shaft unit comprises an outer shaft and an inner shaft, the inner shaft being arranged coaxially in the outer shaft and rotatable relative thereto, the inner shaft and the outer shaft are connected together via a layshaft comprising at least one planetary transmission stage with at least one sun gear, a ring gear, and a planetary group including at least one first and at least one second planet gear;

wherein the at least one first planet gear is arranged between the sun gear and the at least one second planet gear, the at least one second planet gear is arranged between the at least one first planet gear and the ring gear, and the sun gear is coupled directly to the inner shaft of the input shaft unit.

* * * * *